United States Patent
Deshmukh (10) Patent No.: US 11,228,800 B2
(45) Date of Patent: Jan. 18, 2022

(54) VIDEO PLAYER SYNCHRONIZATION FOR A STREAMING VIDEO SYSTEM

(71) Applicant: Sling TV L.L.C., Englewood, CO (US)

(72) Inventor: Shailesh Deshmukh, Foster City, CA (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 16/732,032

(22) Filed: Dec. 31, 2019

(65) Prior Publication Data

US 2021/0204016 A1    Jul. 1, 2021

(51) Int. Cl.
*H04N 21/43* (2011.01)
*H04N 21/414* (2011.01)
*H04N 21/2187* (2011.01)
*H04N 21/442* (2011.01)
(Continued)

(52) U.S. Cl.
CPC ..... *H04N 21/4307* (2013.01); *H04N 21/2187* (2013.01); *H04N 21/41407* (2013.01); *H04N 21/44204* (2013.01); *H04N 21/812* (2013.01); *H04N 21/8455* (2013.01)

(58) Field of Classification Search
CPC .......... H04N 21/4307; H04N 21/2187; H04N 21/41407; H04N 21/44204; H04N 21/812; H04N 21/8455
See application file for complete search history.

(56) References Cited

U.S. PATENT DOCUMENTS

| | | | | |
|---|---|---|---|---|
| 8,549,575 B2* | 10/2013 | Amento | ............... | H04N 21/242 725/116 |
| 10,397,636 B1* | 8/2019 | Kalva | ............... | H04N 21/6547 |

(Continued)

FOREIGN PATENT DOCUMENTS

| | | |
|---|---|---|
| EP | 3179646 A1 | 6/2017 |
| WO | 2016208106 A1 | 12/2016 |

OTHER PUBLICATIONS

Nunome T et al, "An application-level QoS comparison of inter-destination synchronization schemes for continuous media multi-casting", GLOBECOM'03. 2003—IEEE Global Telecommunications Conference. Conference Proceedings; Dec. 1, 2003, p. 3602-3608, vol. 7, San Francisco, CA. XP010677289.

(Continued)

*Primary Examiner* — Randy A Flynn
(74) *Attorney, Agent, or Firm* — Lorenz & Kopf, LLP (57) ABSTRACT

Systems, devices and processes are provided to facilitate the streaming of video content. In general, the systems, devices and processes facilitate the synchronized streaming of video content to a plurality of video player devices. Specifically, the systems, devices and processes provide for the synchronized streaming of video content to a plurality of video player devices while also providing the ability selectively restrict timing adjustments. For example, the timing adjustments in one or more of the video player devices can be selectively prevented from occurring at certain times to comply with content-based or other such restrictions. As one example, the systems, devices and processes can be used to prevent timing adjustments from being made in one or more video player devices during the displaying of commercials and/or certain live content on the video player devices.

14 Claims, 3 Drawing Sheets

(51) Int. Cl.
*H04N 21/845* (2011.01)
*H04N 21/81* (2011.01)

(56) References Cited

U.S. PATENT DOCUMENTS

| | | | | |
|---|---|---|---|---|
| 2006/0112344 | A1* | 5/2006 | Ducheneaut | H04N 21/44016 |
| | | | | 715/758 |
| 2009/0241037 | A1* | 9/2009 | Hyndman | H04L 67/38 |
| | | | | 715/757 |
| 2011/0271299 | A1* | 11/2011 | Kakani | H04N 21/812 |
| | | | | 725/36 |
| 2012/0102233 | A1* | 4/2012 | Shah | H04N 21/4828 |
| | | | | 709/248 |
| 2015/0106841 | A1* | 4/2015 | Wolf | H04N 21/8455 |
| | | | | 725/32 |
| 2015/0120953 | A1 | 4/2015 | Crowe et al. | |
| 2016/0182928 | A1* | 6/2016 | Francisco | H04N 21/6587 |
| | | | | 725/116 |
| 2018/0103078 | A1* | 4/2018 | Goswami | H04N 21/2387 |
| 2019/0141089 | A1* | 5/2019 | Loheide | H04N 21/2187 |

OTHER PUBLICATIONS

EPO, International Search Report issued in IA No. PCT/US2020/066280, dated Mar. 18, 2021.

* cited by examiner

VIDEO PLAYER SYNCHRONIZATION FOR A STREAMING VIDEO SYSTEM

TECHNICAL FIELD

The following discussion generally relates to streaming video systems. More particularly, the following discussion relates to the video player synchronization in streaming video systems.

BACKGROUND

Media content, including video-on-demand (VOD) and television (TV) programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and over-the-top (OTT) TV providers, as well as entities owning or operating streaming video platforms. It is also now commonplace for end users to placeshift media content stored in memory contained in or accessible to a home media receiver, such as an STB located at the end user's residence, over a network for viewing on a smartphone, tablet, or other portable media receiver operated by the end user.

Recently there has been an increasing desire to stream such media content to multiple users simultaneously in a way that allows for a shared user experience. Unfortunately, streaming media content to multiple users simultaneously raises significant issues, including the need to provide a time aligned experience to these multiple users while abiding by various content related restrictions.

Thus, there remains a continuing desire to create systems and methods that improve the ability to stream media content to multiple viewers while maintaining the ability to meet content-related restrictions on the streaming of such media. Other desirable features and characteristics will become apparent from the subsequent detailed description and the appended claims, taken in conjunction with the accompanying drawings and this background section.

BRIEF SUMMARY

Various embodiments provide systems, devices and processes to improve the streaming of video content. In general, the systems, devices and processes facilitate the synchronized streaming of video content to a plurality of video player devices. Specifically, the systems, devices and processes provide for the synchronized streaming of video content to a plurality of video player devices while also providing the ability selectively restrict the timing adjustments used to achieve this synchronization. For example, the timing adjustments in one or more of the video player devices used to achieve this synchronization can be selectively prevented from occurring at certain times to comply with content-based or other such restrictions. As one example, the systems, devices and processes can be used to prevent timing adjustments from being made in one or more video player devices during the displaying of commercials and/or certain live content on the video player devices.

Specifically, in one example embodiment the systems, devices and processes monitor the video stream being received at each of the plurality of video player devices, and selectively set and unset one or more flags on the video player devices when specific types of content are being received and displayed. Then in response to a set of criteria being met, video timing adjustments are selectively made at the video player devices. For example, video timing adjustments are selectively performed at video player devices when a video timing delta exceeds a threshold and in response to one or more flags being set and/or unset.

The embodiments described herein can be used to provide the synchronized viewing of video content streamed to a plurality of remotely located video player devices while also providing the ability selectively restrict the timing adjustments used to facilitate this synchronized viewing. The ability to provide synchronized viewing is particularly important for platforms that wish to provide a shared viewing experience of video content for multiple remotely located users. Specifically, the synchronized viewing can facilitate the shared viewing experience by allowing each of the users to simultaneously view and communicate with each other in real time about the streamed video content. In contrast, if the content was significantly unsynchronized at the different video player devices then different users would be viewing and reacting to different events at any given moment in time. Thus, the embodiments described herein can be used to facilitate a shared user experience that can only be provided with synchronized viewing of the video stream.

Furthermore, the embodiments described can provide this synchronized viewing while also preventing timing adjustments from occurring when commercial content and/or live content is being displayed. This prevents the timing adjustment from interfering with those types of content, and thus can be used to ensure that various restrictions (e.g., contractual restrictions) on those types of content are adhered to while otherwise providing for viewing synchronization.

In one example embodiment, an automated process is executable by a plurality of video player devices, where the plurality of video player devices are in communication with a streaming media server over a network and receiving a video stream from the streaming media server. In such an embodiment the automated process comprises: at each of the plurality of video player devices, selectively setting a commercial flag responsive to commercial content in the video stream received at the video player device and unsetting the commercial flag responsive to non-commercial content in the video stream received at the video player device; at each of the plurality of video player devices, measuring a video timing delta; and at each of the plurality of video player devices, selectively performing video timing adjustment in response to the video player device meeting a set of criteria, the set of criteria including the video timing delta exceeding a threshold and the commercial flag being unset.

A further example may be implemented wherein the plurality of video player devices comprise a plurality of virtual-reality (VR) headsets.

A further example may comprise, at each of the plurality of video player devices, selectively setting a live flag responsive to live content in the video stream received at the video player device and unsetting the live flag responsive to non-live content in the video stream received at the video player device, and wherein the set of criteria further includes the live flag being unset.

A further example may be implemented wherein the selectively performing video timing adjustment comprises the video player device skipping content in the video stream to reduce the video timing delta.

A further example may be implemented wherein the selectively performing video timing adjustment comprises the video player device delaying content in the video stream to reduce the video timing delta.

A further example may be implemented to include monitoring the video stream at each of the plurality of video player devices for commercial content.

A further example may be implemented wherein each of the plurality video player devices includes a streaming application being stored in memory and executed by a processor, and wherein the streaming application performs the monitoring the video stream, and wherein the streaming application performs the selectively setting the commercial flag.

A further example may be implemented wherein the measuring the video timing delta comprises measuring a video displaying timing difference between a host video player device and one of the plurality of video player devices.

In another embodiment, a video player device in communication with a streaming server over a network and receiving a video stream from the streaming server is provided, the video player device comprising a processor and a memory, wherein the processor is configured to perform an automated process by executing digital instructions stored in the memory, wherein the automated process comprises: selectively setting a commercial flag at the video player device responsive to commercial content in the video stream received at the video player device and unsetting the commercial flag responsive to non-commercial content in the video stream received at the video player device; measuring a video timing delta relative to a host video player device in communication with the streaming server and receiving the video stream from the streaming server; and selectively performing video timing adjustment at the video player device in response to the video player device meeting a set of criteria, the set of criteria including the video timing delta exceeding a threshold and the commercial flag being unset.

A further example may be implemented wherein the video player device comprises a first virtual-reality (VR) headset and wherein the host video player device comprises a second VR headset.

A further example may be implemented wherein the automated process further comprises selectively setting a live flag at the video player device responsive to live content in the video stream received at the video player device and unsetting the live flag responsive to non-live content in the video stream received at the video player device, and wherein the set of criteria further includes the live flag being unset.

A further example may be implemented wherein the selectively performing video timing adjustment at the video player device comprises the video player device skipping content in the video stream to reduce the video timing delta.

A further example may be implemented wherein the selectively performing video timing adjustment at the video player device comprises the video player device delaying content in the video stream to reduce the video timing delta.

A further example may be implemented wherein video player devices includes a streaming application being stored in memory and executed by a processor, and wherein the streaming application monitors the video stream at the video player device for commercial content, and wherein the streaming application further performs the selectively setting the commercial flag.

A further example may be implemented wherein the measuring the video timing delta comprises measuring a video displaying timing difference between a host video player device and the video player device.

In another embodiment, an automated process executable by a plurality of video player devices is provided, each of the plurality of video player devices in communication with a streaming server over a network, the automated process comprising: receiving at each of the plurality of video player devices a video stream from the streaming server; monitoring the video stream at each of the plurality of video player devices for commercial content and live content; and at each of the plurality of video player devices: selectively setting a commercial flag responsive to commercial content in the video stream currently being received for displaying at the video player device and unsetting the commercial flag responsive to non-commercial content in the video stream being received for displaying at the video player device; selectively setting a live flag responsive to live content in the video stream currently being received for displaying at the video player device and unsetting the live flag responsive to non-live content in the video stream currently being received for displaying at the video player device; measuring a video timing delta; and selectively performing video timing adjustment in response to the video timing delta exceeding a threshold and both the commercial flag being unset and the live flag being unset, while not performing video timing adjustment when either the commercial flag is set or the live flag is set.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

Various embodiments provide systems, devices and processes to improve the streaming of video content. In general, the systems, devices and processes facilitate the synchronized streaming of video content to a plurality of video player devices. Specifically, the systems, devices and processes provide for the synchronized streaming of video content to a plurality of video player devices while also providing the ability selectively restrict timing adjustments used to achieve this synchronization. For example, the timing adjustments used to achieve this synchronization in one or more of the video player devices can be selectively prevented from occurring at certain times to comply with content-based or other such restrictions. As one example, the systems, devices and processes can be used to prevent timing adjustments from being made in one or more video player devices during the displaying of commercials and/or certain live content on the video player devices.

Specifically, in one example embodiment the systems, devices and processes monitor the video stream being received at each of the plurality of video player devices, and selectively set and unset one or more flags on the video player devices when specific types of content are being streamed and displayed. Then in response to a set of criteria being met, video timing adjustments are selectively made at the video player devices. For example, video timing adjustments are selectively performed at video player devices when a video timing delta exceeds a threshold and in response to one or more flags being set and/or unset.

As will be described in greater below, these various embodiments can facilitate a shared viewing experience by facilitating synchronized video content that allows the users to simultaneously view the video content and communicate with each other in real time about the video content. Furthermore, this synchronized viewing is facilitated while also preventing timing adjustments used to achieve this synchronization from occurring when certain types of content are being displayed. This prevents the timing adjustment from interfering with those types of content, and thus can be used to ensure that various restrictions (e.g., contractual restrictions) on those types of content are adhered to while otherwise providing for viewing synchronization.

The general concepts described herein may be implemented in any video streaming context, but are especially relevant to the streaming of television programming that commonly includes commercials and live programming. Of course, equivalent embodiments could be implemented within other contexts, settings or applications as desired.

Figure 1:
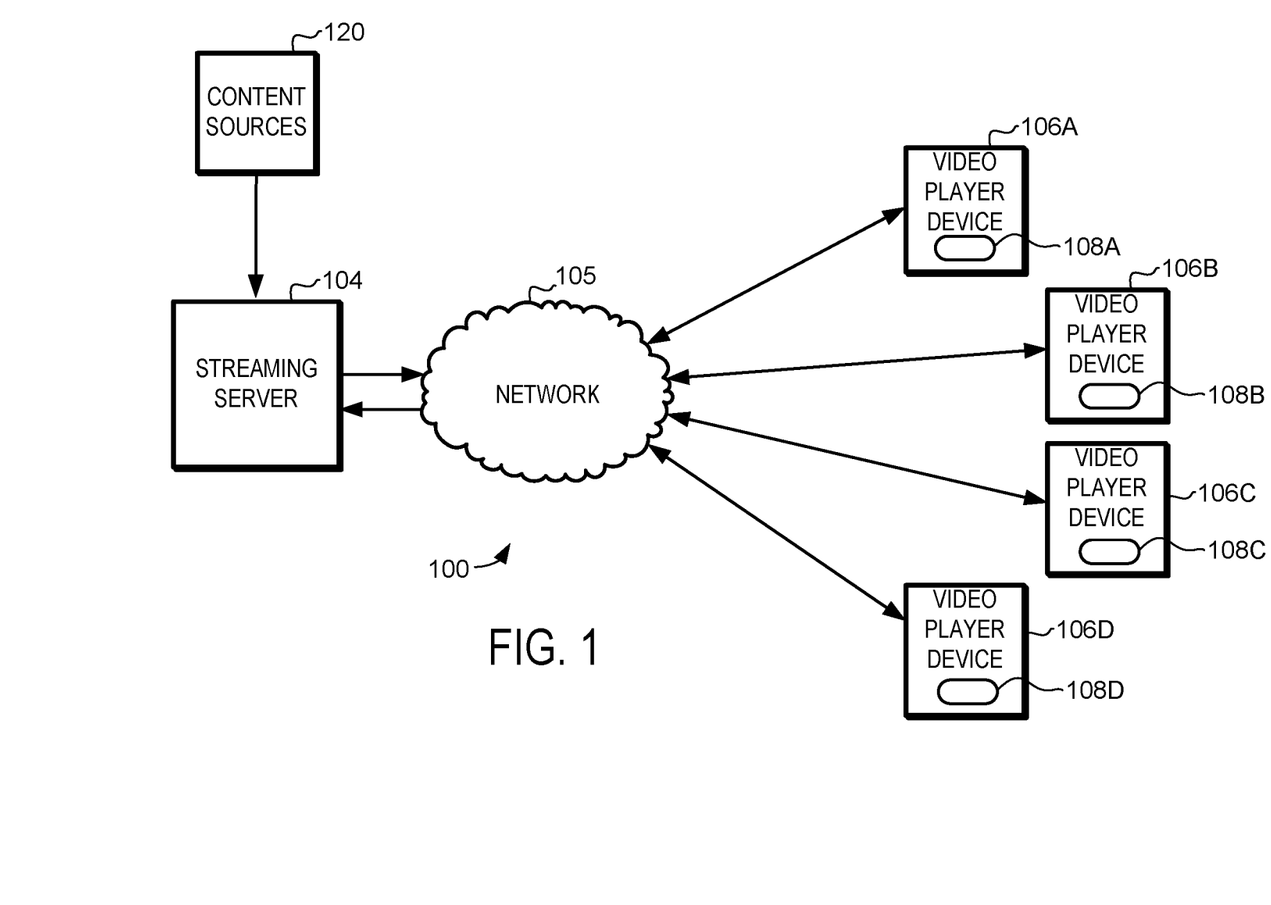
FIG. 1 is a diagram of an example streaming video system that includes a plurality of video player devices.

Turning now to the drawings and with initial reference to FIG. 1, a video streaming system 100 suitably includes a streaming server 104 and a plurality of video player devices 106A-D. In general, the streaming server 104 receives video content from one or more content sources 120, and transmits that video content through the network 105 to the video player devices 106A-D in the form of a video stream that can be received, processed, and displayed at the video player devices 106A-D.

In general, the content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-D. For example, the streaming server 104 can transmit an encoded video stream via a content delivery network (CDN) for distribution on network 105 (e.g., the Internet) as part of an RSDVR, VOD or other video streaming service. The video streams are thus transmitted to the video player devices 106A-D.

In some embodiments the content sources 102 and/or streaming server 104 can include content identification logic that can identify some specific types of content in the video content. For example, in some embodiments the streaming server 104 is implemented to identify commercial content and/or live content and encode corresponding identifying information into the video streams transmitted to the video player devices 106A-D. Detailed examples of such content identification techniques will be described in greater detail below with reference to FIG. 3.

In general, each of the video player devices 106A-D includes a combination of hardware and/or software needed to receive, process, and play the video streams received from the streaming server 104. As examples, each of the video player devices 106A-D can be implemented to include a streaming application stored in memory and being executed by a suitable processor. As some specific examples, each of the video player devices 106A-D can be implemented with any suitable computing device, including laptops, tablets and mobile communication devices (e.g., smart phones). Such devices may include an integrated display screen, or may be coupled to a separate display screen. In one specific implementation, one or more of the video player devices 106A-D is implemented as a virtual reality (VR) device. For example, the video player devices 106A-D can be implemented with a suitable VR headset. Additionally, in accordance with the embodiments described herein, each video player device 106A-D includes one or more flags 108A-D that are used to provide control of timing adjustment used for synchronization. Additionally, in accordance with the embodiments described herein, each video player device 106A-D can include the ability to identify one or types of content, including commercial content and/or live content.

In one example embodiment, the video streaming system 100 is implemented to perform one or more automated processes during the streaming of video content from the streaming server 104 to the plurality of video player devices 106A-B. In general, these automated processes provide for the synchronized streaming of video content to the plurality of video player devices 106A-D while also providing the ability selectively restrict timing adjustments used to achieve this synchronization. For example, the timing adjustments in one or more of the video player devices 106A-D can be selectively prevented from occurring at certain times to comply with content-based or other such restrictions. As one example, the automated process can be used to prevent timing adjustments from being made in one or more video player devices 106A-D during the displaying of commercials and/or certain live content on the video player devices 106A-D.

As one specific example, the automated process can be implemented to selectively set commercial flags (e.g., flags 108A-D) at each of the video player devices 106A-D responsive to commercial content in the video stream received at the corresponding video player devices 106A-D and unsetting the commercial flag responsive to non-commercial content in the video stream received at the corresponding video player devices 106A-D. The automated process can be further implemented to measure a video timing delta at each of the plurality of video player devices 106A-D. The automated process can be further implemented to selectively perform video timing adjustment at the video player devices 106A-D in response meeting a set of criteria, where the set of criteria includes the video timing delta exceeding a threshold and the commercial flag being unset. In such an embodiment video timing adjustments are only performed at video player devices 106A-D for which the video timing delta exceeds the threshold and the commercial flag is unset.

In another embodiment, the automated process also includes selectively setting a live flag responsive live content in the video stream received at the video player devices 106A-D and unsetting the live flag responsive non-live content in the video stream received at the video player devices 106A-D. In such an embodiment the set of criteria can further include the live flag being unset. In such an embodiment video timing adjustments are only performed at video player devices 106A-D for which the video timing delta exceeds the threshold, the commercial flag is unset, and the live flag is also unset.

In another embodiment, the step of selectively performing video timing adjustment includes skipping content in the video stream to reduce the video timing delta at the corresponding video player device 106A-D. Conversely, in yet another embodiment the step of performing video timing adjustment includes delaying content in the video stream to reduce the video timing delta at the corresponding video player device 106A-D.

In another embodiment, the automated process also includes monitoring the video stream at each of the plurality of video player devices 106A-D for commercial content. Likewise, in yet another embodiment, the automated process also includes monitoring the video stream at each of the plurality of video player devices 106A-D for live content. As will be described in greater detail below, these steps can be performed by analyzing metadata encoded in the video stream.

As noted above, in typical embodiments each of the video player devices 106A-D can be implemented to include a streaming application stored in memory and being executed by a suitable processor. In such an embodiment the streaming application can be implemented to perform the monitoring of the video stream for commercial and/or live content. And in such embodiments the streaming application at each of the video player devices 106A-D can perform the selective setting of the commercial flag and/or live content when such content is identified in the video stream.

In another embodiment, the measuring of the video timing delta at the video player devices 106A-D comprises measuring a video displaying timing difference between a host video player device and one of the plurality of video player devices 106A-D. Thus, one of the video player devices 106A-D or another such video player device provides the timing benchmark by which the video timing deltas are measured.

These various embodiments described above can provide several potential advantages. Specifically, the embodiments described can be used to provide the synchronized viewing of video content streamed to a plurality of remotely located video player devices 106A-D while also providing the ability selectively restrict the timing adjustments used to facilitate this synchronized viewing. The ability to provide synchronized viewing is particularly important for platforms that wish to provide a shared viewing experience of video content for multiple remotely located users. Specifically, the synchronized viewing can facilitate the shared viewing experience by allowing each of the users to simultaneously view and communicate with each other in real time about the streamed video content at the video player devices 106A-D. In contrast, if the content was significantly unsynchronized at the different video player devices 106A-D then different users would be viewing and reacting to different events at any given moment in time. Thus, the embodiments described herein can be used to facilitate a shared user experience that can only be provided with synchronized viewing of the video stream.

Furthermore, the embodiments described can provide this synchronized viewing while also preventing timing adjustments from occurring when commercial content and/or live content is being displayed. This prevents the timing adjustment from interfering with those types of content, and thus can be used to ensure that various restrictions (e.g., contractual restrictions) on those types of content are adhered to while otherwise providing for viewing synchronization.

Figure 2:
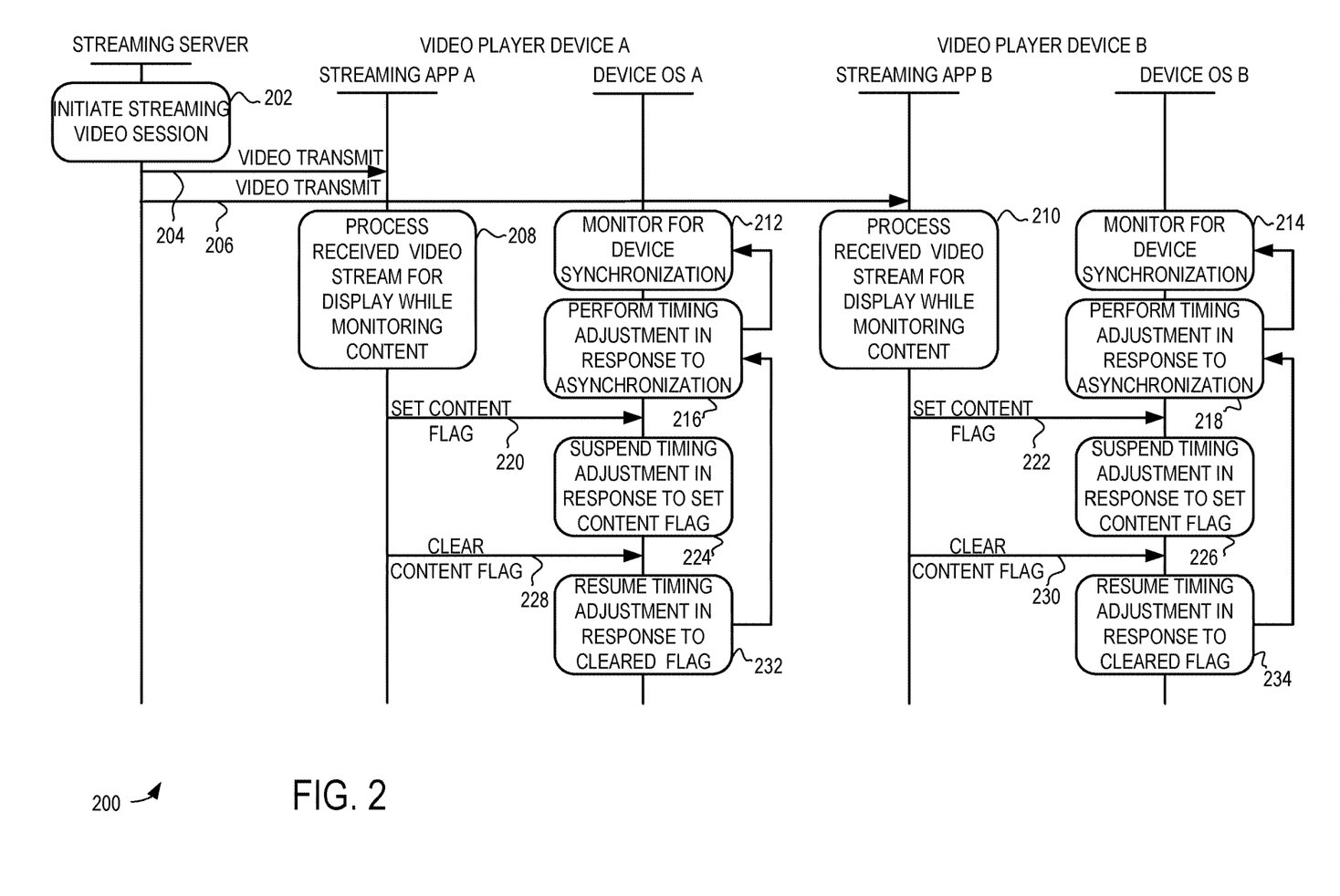
FIG. 2 is a flowchart showing various processes executable by various devices in a streaming media system.

Turning now to FIG. 2, a process flow diagram 200 illustrates various example processes and data flows that can be automatically executed by video player devices (e.g., video player devices 106A-D) and a streaming server (e.g., streaming server 104) in a video streaming system (e.g., video streaming system 100). Specifically, the process flow diagram 200 illustrates a process flow between a streaming server and two video player devices (labeled A and B in FIG. 2) where each video player device A-B includes at least a streaming application and a device operating system (OS).

To facilitate the process flow, communications between the various devices can be initiated and established in any suitable manner. For example, communication between the various devices and networks may be established using Internet or other protocols that can include both wireless networking systems (e.g., Wi-Fi) or wired networking systems (e.g., Ethernet or HDMI).

At process step 202 the streaming server initiates a streaming video session, and begins transmitting a video stream to the video player devices using video transmit functions 204 and 206. In a typical embodiment the streaming server initiates the streaming video session at the direction of one of the video player devices. In one embodiment, the video player device that directs the streaming server to begin streaming and otherwise controls the streaming is designated as the host device. As will be described in greater detail below this host device can be one of the video player devices A-B or another such video player device not shown in FIG. 2. Also, as will be described in greater detail below in such embodiments this host device can be used as a referencing in calculating the video time delta of the other video player devices.

As was described above, such a process step 202 and video transmit functions 204, 206 can include the encoding and transmitting of video content from any suitable content source. Additionally, such processing and transmitting can include transmitting using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the video player devices as input video streams.

At process steps 208 and 210, the streaming applications on the video player devices A-B process the received input video streams for display on the video player device while monitoring the content of the input video streams. In these process steps the streaming applications perform typical video processing tasks associated with the receiving and displaying of video. For example, the streaming applications can perform various decoding and rendering functions as needed. Alternatively some of these decoding and rendering functions may be performed by the device OS or other elements in the video player devices A-B.

While these various functions are performed by the streaming applications in process steps 208 and 210 the streaming applications will also monitor the content of the input video stream. For example, the streaming applications can monitor for either indications of commercial content (e.g., video advertisements) or live content (e.g., sports TV programming, news TV programming, etc.). This monitoring of the content can be performed using any suitable technique. As one example, the streaming applications can monitor the received input video streams for encoded information that identifies specific types of content.

At process steps 212 and 214 the video player devices monitor for device synchronization. In general, these process steps 212 and 214 determine a video timing delta between selected video player devices. For example, these process steps 212 and 214 can measure the video timing delta between devices, or between the devices and another device that is identified as the host device. In each case the video timing delta represents the timing difference of video being displayed on two devices (e.g., the timing difference between video being displayed on the host video player device and one other video player device A-B). In such an embodiment the host video player device provides the timing benchmark by which the video timing deltas are referenced or otherwise determined. Thus, in such an embodiment the timing delta can represent the time difference that the video being displayed on the video player device A-B is ahead of or behind the video being displayed on the host video player device or other video player device.

Process steps 212 and 214 can be performed in a variety of ways. As one example, the streaming applications on the video player devices (including the host video player device) can report timing information for each device to the device OS. For example, the streaming application in each video player device can report to the device OS where video player device is in the video stream in displaying the video content at a reference moment in time. As one specific implementation, this information can be provided from session playback state information provided by the streaming application. One or more of the video player devices can then share this information with a device server or other such common system that facilitates communication between the video player devices. The device server can then share selected timing information among the other video player devices, and that shared timing information can then be used by the video player devices to calculate relative timing deltas.

In one specific embodiment, the streaming application on the host video player device shares timing information with its device OS, and that timing information is then shared to all other video player devices that are part of the same co-watching session via the device server. Each of these video player devices can then use the information from the host video player device and the timing information from its own streaming application to calculate its timing delta relative to the host video player device. As one example, such embodiments can be implemented using suitable media session connector protocol functions.

At process steps 216 and 218 the video player devices A-B perform timing adjustments in response to asynchronization between devices. In general, these process steps 216 and 218 can be further implemented to selectively perform video timing adjustment at the video player devices A-B in response meeting a set of criteria, where the set of criteria includes the video timing delta exceeding a threshold and one or more flags being unset.

In such an embodiment these video timing adjustments are only performed at video player devices A-B for which the video timing delta exceeds a designed threshold amount. These video timing adjustments can be performed by selectively skipping or pausing content in the video streams to reduce the video timing delta. Specifically, the video timing adjustment can comprise skipping content in the video stream to reduce the video timing delta when the video player device A-B is behind the host or other device. Alternatively, the video timing adjustment include can include pausing or delaying content in the video stream when the video player device A-B is ahead of the host or other device. In either case, the video timing adjustment serves to reduce the video timing delta at the corresponding video player device A-B.

Typically, this process would be continued at a video player device A-B until the timing delta is below a threshold amount for that device. Thus, the process can return to steps 212 and 214 and continually perform these steps and steps 216 and 218 until the timing delta is below an acceptable amount.

As was described above, at process steps 208 and 210 the streaming applications on the video player devices A-B process the received input video streams for display on the video player device while monitoring the content of the input video streams. For example, the streaming applications can monitor for either indications of commercial content (e.g., video advertisements) or live content (e.g., sports TV programming, news TV programming, etc.).

When a type of monitored content is detected in the input video stream the flag set functions 220 and 222 can set the appropriate flag on the video player device A-B. For example, an "ad flag" can be selectively set in response to commercial content and a "live flag" can be selectively set in response to live content. However, these are two examples of the type of flags that can be set in response to the detection of particular content in the video stream.

Any suitable function can be used to implement the flag set functions 220 and 222. For example, these functions can be implemented using suitable set playback state functions.

At process steps 224 and 226 the timing adjustments are suspended in response to the setting of a content flag. Thus, these process steps 224 and 226 suspend timing adjustments because the all the criteria in a set of criteria determining when such adjustments should be made are not all met. Thus, even if the timing delta exceeds the threshold amount timing adjustments to reduce that timing delta will not be performed as long as the content flag is set.

Again, in one specific embodiment the content flag can comprise either an ad flag or a live flag. In yet other embodiments both an ad flag and a live flag can be implemented. In yet other embodiments additional flags can be implemented. In such embodiments the criteria in the set of criteria can include both or all flags being unset. Thus, in in such embodiments the timing adjustments will be suspended as long as either the ad flag or the live flag is set.

When the type of monitored content is no longer detected in the input video stream the flag clearing functions 228 and 230 can clear the appropriate flag on the video player device A-B. For example, an "ad flag" can be cleared or unset in response to the ending of commercial content and a "live flag" can be selectively cleared or unset in response to the ending of live content.

Any suitable function can be used to implement the flag clearing functions 228 and 230. For example, these functions can be implemented using suitable set playback state functions.

At process steps 232 and 234 the timing adjustments are resumed in response to the clearing of the content flag(s).

Thus, these process steps 232 and 234 resume timing adjustments because again the criteria in a set of criteria determining when such adjustments should be made can now be met. Thus, when a timing delta again exceeds the threshold amount timing adjustments to reduce that timing delta will again be performed.

As such, the process flow 200 can return to process steps 216 and 218 respectively. At process steps 216 and 218 the video player devices A-B perform timing adjustments in response to asynchronization between devices. And again, this process can be continued at a video player device A-B until the timing delta is below a threshold amount for that device. Thus, the process can return to steps 212 and 214 and continually perform these steps and steps 216 and 218 until the timing delta is below an acceptable amount.

The process flow 200 thus can provide for the synchronized viewing of video content streamed to a plurality of remotely located video player devices A-B while also providing the ability selectively restrict the timing adjustments used to facilitate this synchronized viewing during certain types of content. The ability to provide this synchronized viewing is particularly important for platforms that wish to provide a shared viewing experience of video content for multiple remotely located users. Specifically, the synchronized viewing can again facilitate the shared viewing experience by allowing each of the users to simultaneously view and communicate with each other in real time about the streamed video content at the video player devices A-B. Furthermore, this process flow 200 can provide this synchronized viewing while also preventing timing adjustments from occurring when commercial content and/or live content is being displayed. This prevents the timing adjustment from interfering with those types of content, and thus can be used to ensure that various restrictions (e.g., contractual restrictions) on those types of content are adhered to while otherwise providing for viewing synchronization.

Figure 3:
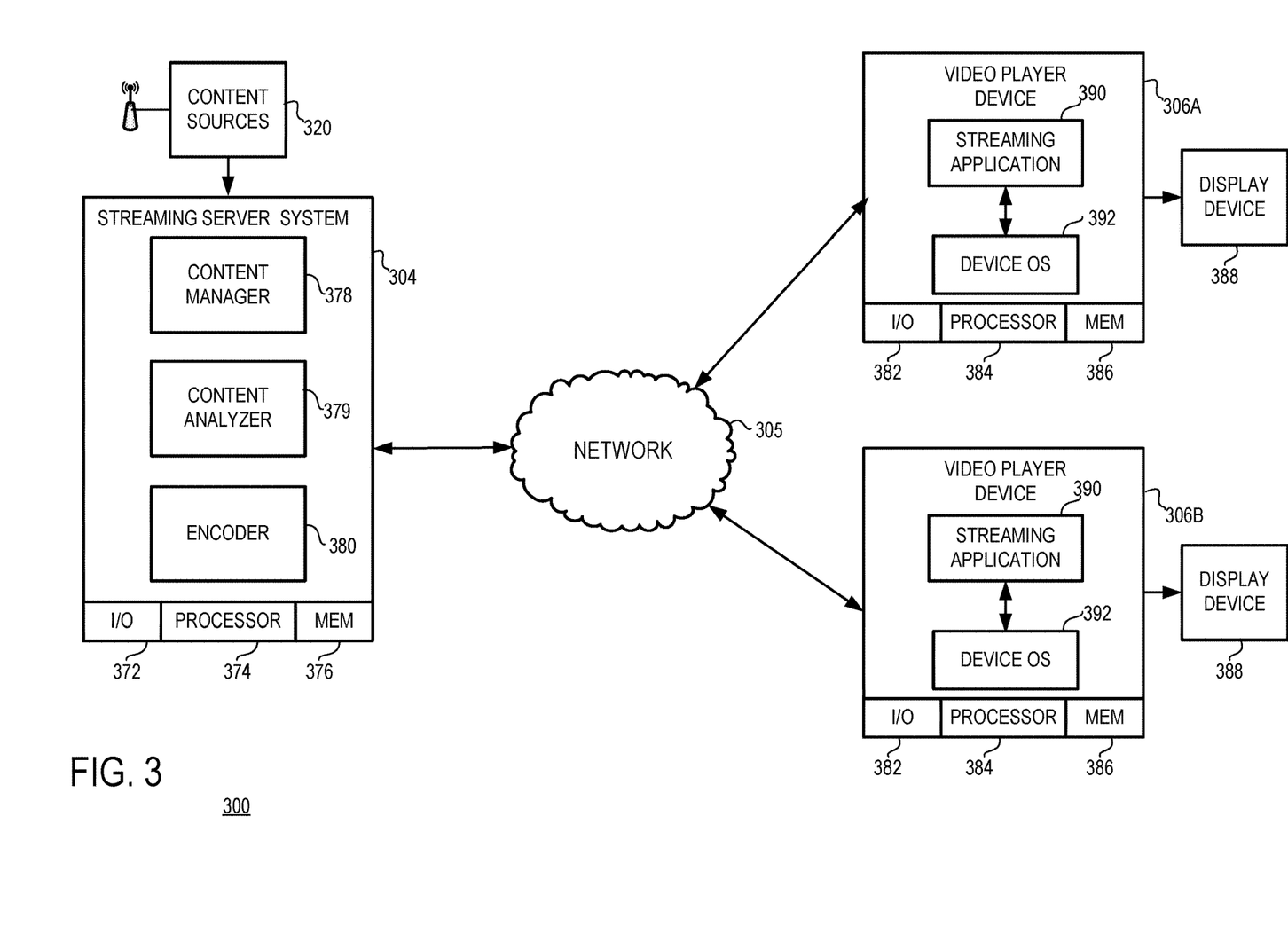
FIG. 3 is a detailed diagram of one example implementation of a streaming media system.

Turning now to FIG. 3 a video streaming system 300 suitably includes a streaming server system 304 and a plurality of video player devices 306A-B. In general, the streaming server system 304 receives video content from one or more content sources 320, and transmits that video content through the network 305 to the video player devices 306A-B in the form of a video stream that can be received, processed, and displayed at the video player devices 306A-B.

In general, the content sources 320 can be any type of video content source, including media providers, content aggregators or distributors such as a cable television system operator, a direct broadcast satellite (DBS) system operator, or simply a network service provider or the like. The streaming server system 304 processes the received content into a suitable format streaming to the video player devices 306A-B. To facilitate this, the streaming server system 304 includes at least an I/O 372, a processor 374, and a memory 376. Additionally, the streaming server system 304 includes a content manager 378, a content analyzer 379, and an encoder 380.

In general, each of the video player devices 306A-B includes a combination of hardware and/or software needed to receive, process, and play the video streams received from the streaming server system 304. For example, each of the video player devices includes an I/O 382, a processor 384, a memory 386, and a display device 388. Furthermore, each of the video player devices 306A-B includes a streaming application 390 and a device OS 392 residing in memory 386 and being executed by the processor 384. As some specific examples, each of the video player devices 306A-B can be implemented with any suitable computing device, including laptops, tablets and mobile communication devices (e.g., smart phones). Such devices may include an integrated display screen 388, or may be coupled to a separate display screen 388. In one specific implementation, one or more of the video player devices 306A-B is implemented as a virtual reality (VR) device. For example, the video player devices 306A-B can be implemented with a suitable VR headset that includes a headset mounted display screen 388.

The content sources 320 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals for one or more networks, channels or the like are received in any format by the system operator via satellite, fiber optic or any other conventional wireless or physical media for transmitting television signals. The signals are received, demodulated and decoded as needed by any appropriate receiver(s) to extract program signals that represent the decoded television program stream. Alternately or additionally, content sources 320 may receive content directly from a broadcaster, distributor or other source, as desired.

In a typical embodiment the received programming signals are analyzed as appropriate to identify the program contents. For example, the content analyzer 379 can be implemented to analyze audio and/or video content in the programming signals. Such a system can be used to recognize advertisements (e.g., commercials) or other portions of the underlying content. In a typical embodiment, the content analyzer 379 executes a software application that performs the analysis based upon the audio and/or video content received. In various embodiments, content analyzer 379 may consider average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Various examples of automatic content analysis software based upon audio and/or video data processing techniques are commercially available from Audible Magic Corporation, the Caipy Corporation, and/or any number of other sources. Many different audio and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software (e.g., database products available from Microsoft, IBM, Oracle, MySQL, SAP and/or any other vendor), or the database may be a custom database developed to store content recognition data, as desired. Such a database may reside on the same computing hardware as the streaming server system 304, or separate computing resources could be provided, including any sort of cloud-based computing resources.

In one specific embodiment, the content analyzer 379 is configured to recognize scene changes in the underlying content. When a different scene is identified in the content analyzer 379 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content analyzer 379 is therefore able to identify advertisements or other contents of the received television broadcasts and other video though analysis of the underlying audio or video content.

In many implementations, content identification is performed by the content analyzer 379 in parallel for multiple channels that may be simultaneously received for content aggregation, for collection of advertising data, or for any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments the content analyzer 379 can perform content analysis in parallel with the encoding provided by the encoder 380. The encoder 380 can encode live broadcast signals and other such video content for adaptive streaming on the network 305 and/or for broadcast via cable, direct broadcast satellite, terrestrial broadcast, and/or the like. Encoder 380, for example, can be used to encode signals into a suitable format for broadcast via cable, DBS, or the like. Such broadcasts may be ultimately received by video player devices 306A-B via the network 305 or the like. In one specific example, the encoder 380 suitably encodes programs contained within signals from the content sources 320 into one or more adaptive streams that each representing a media program in its entirety, but with different bit rates, frame rates, resolution and/or other levels of quality. Typically, each stream is made up of smaller segments that each represent a small portion of the program content with a single data file. Each stream is typically encoded so that segments of the different streams are interchangeable with each other, often using a common timing index. This allows a client video player devices 306A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 305 and can be served by conventional CDN or other web-type servers, thereby providing a convenient mechanism for distributing adaptive media streams to a variety of different client devices on network 305.

Again, other embodiments may use different encoders for the encoder 380. Still other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Content manager 378 is provided to manage and distribute electronic program guide (EPG) data and other information about the programs that are distributed within streaming server system 304. The content manager 378 may also be implemented to process information relating to advertisements or other portions of the content stream, to associate actions to be performed by the viewer and/or the playback device based upon the content of the stream, and/or for any other purpose.

The data maintained by the content manager 378 could include channel information and timing information about each entry so that the particular content can be readily identified. Other embodiments may use different identification data, such as distributor or network information, or any other information as desired. Some implementations may incorporate conventional EPG data (e.g., data obtained from a vendor or other source), while other implementations may use channel and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 306A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

In accordance with the embodiments described herein the video streaming system 300 is implemented to perform one or more automated processes during the streaming of video content from the streaming server system 304 to the plurality of video player devices 306A-B. In general, these automated processes provide for the synchronized streaming of video content to the plurality of video player devices 306A-B while also providing the ability selectively restrict timing adjustments. For example, the timing adjustments in one or more of the video player devices 306A-B can be selectively prevented from occurring at certain times to comply with content-based or other such restrictions. As one example, the automated process can be used to prevent timing adjustments from being made in one or more video player devices 306A-B during the displaying of commercials and/or certain live content on the video player devices 306A-B.

To facilitate this, each video player device 306A-B includes one or more flags that are used to provide control of timing adjustment used for synchronization. Additionally, in accordance with the embodiments described herein, each video player device 306A-B can include the ability to identify one or types of content, including commercial content and/or live content.

As one specific example, the automated process can be implemented to selectively set commercial flags at each of the video player devices 306A-B responsive to commercial content in the video stream received at the corresponding video player devices 306A-B and unsetting the commercial flag responsive to non-commercial content in the video stream received at the corresponding video player devices 306A-B. The automated process can be further implemented to measure a video timing delta at each of the plurality of video player devices 306A-B. The automated process can be further implemented to selectively perform video timing adjustment at the video player devices 306A-B in response meeting a set of criteria, where the set of criteria includes the video timing delta exceeding a threshold and the commercial flag being unset. In such an embodiment video timing adjustments are only performed at video player devices 306A-B for which the video timing delta exceeds the threshold and the commercial flag is unset.

The streaming system 300 can thus provide for the synchronized viewing of video content streamed to a plurality of remotely located video player devices 306A-B while also providing the ability selectively restrict the timing adjustments used to facilitate this synchronized viewing during certain types of content. The ability to provide this synchronized viewing is particularly important for platforms that wish to provide a shared viewing experience of video content for multiple remotely located users. Specifically, the synchronized viewing can again facilitate the shared viewing experience by allowing each of the users to simultaneously view and communicate with each other in real time about the streamed video content at the video player devices 306A-B. Furthermore, the streaming system 300 can provide this synchronized viewing while also preventing timing adjustments from occurring when commercial content and/or live content is being displayed. This prevents the timing adjustment from interfering with those types of content, and thus can be used to ensure that various restrictions (e.g., contractual restrictions) on those types of content are adhered to while otherwise providing for viewing synchronization.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a plurality of video player devices, each of the plurality of video player devices in communication with a streaming server over a network and receiving a video stream from the streaming server, the automated process comprising:
    at each of the plurality of video player devices, selectively setting a commercial flag responsive to commercial content in the video stream received at the video player device and unsetting the commercial flag responsive to non-commercial content in the video stream received at the video player device;
    at each of the plurality of video player devices, selectively setting a live flag responsive to live content in the video stream received at the video player device and unsetting the live flag responsive to non-live content in the video stream received at the video player device;
    at each of the plurality of video player devices, measuring a video timing delta, where the video timing delta comprises a video displaying timing difference between a host video player device and one of the plurality of video player devices; and
    at each of the plurality of video player devices, selectively performing video timing adjustment in response to the video player device meeting all criteria in a set of criteria, the set of criteria including the video timing delta exceeding a threshold, the commercial flag being unset, and the live flag being unset.

2. The automated process of claim 1 wherein the plurality of video player devices comprise a plurality of virtual-reality (VR) headsets.

3. The automated process of claim 1 wherein the selectively performing video timing adjustment comprises the video player device skipping content in the video stream to reduce the video timing delta.

4. The automated process of claim 1 wherein the selectively performing video timing adjustment comprises the video player device delaying content in the video stream to reduce the video timing delta.

5. The automated process of claim 1 further comprising monitoring the video stream at each of the plurality of video player devices for commercial content.

6. The automated process of claim 5 wherein each of the plurality video player devices includes a streaming application being stored in memory and executed by a processor.

7. The automated process of claim 6 wherein the streaming application performs the monitoring the video stream.

8. The automated process of claim 6 wherein the streaming application performs the selectively setting the commercial flag.

9. A video player device in communication with a streaming server over a network and receiving a video stream from the streaming server, the video player device comprising a processor and a memory, wherein the processor is configured to perform an automated process by executing digital instructions stored in the memory, wherein the automated process comprises:
    selectively setting a commercial flag at the video player device responsive to commercial content in the video stream received at the video player device and unsetting the commercial flag responsive to non-commercial content in the video stream received at the video player device;

selectively setting a live flag at the video player device responsive to live content in the video stream received at the video player device and unsetting the live flag responsive to non-live content in the video stream received at the video player device;

measuring a video timing delta relative to a host video player device in communication with the streaming server and receiving the video stream from the streaming server, where the video timing delta comprises a video displaying timing difference between the host video player device and the video player devices; and selectively performing video timing adjustment at the video player device in response to the video player device meeting all criteria in a set of criteria, the set of criteria including the video timing delta exceeding a threshold, the commercial flag being unset, and the live flag being unset.

10. The video player device of claim 9 wherein the video player device comprises a first virtual-reality (VR) headset and wherein the host video player device comprises a second VR headset.

11. The video player device of claim 9 wherein the selectively performing video timing adjustment at the video player device comprises the video player device skipping content in the video stream to reduce the video timing delta.

12. The video player device of claim 9 wherein the selectively performing video timing adjustment at the video player device comprises the video player device delaying content in the video stream to reduce the video timing delta.

13. The video player device of claim 9 wherein video player devices includes a streaming application being stored in memory and executed by a processor, and wherein the streaming application monitors the video stream at the video player device for commercial content, and wherein the streaming application further performs the selectively setting the commercial flag.

14. An automated process executable by a plurality of video player devices, each of the plurality of video player devices in communication with a streaming server over a network, the automated process comprising:

receiving at each of the plurality of video player devices a video stream from the streaming server;

monitoring the video stream at each of the plurality of video player devices for commercial content and live content; and at each of the plurality of video player devices:

selectively setting a commercial flag responsive to commercial content in the video stream currently being received for displaying at the video player device and unsetting the commercial flag responsive to non-commercial content in the video stream being received for displaying at the video player device;

selectively setting a live flag responsive to live content in the video stream currently being received for displaying at the video player device and unsetting the live flag responsive to non-live content in the video stream currently being received for displaying at the video player device;

measuring a video timing delta, where the video timing delta comprises a video displaying timing difference between a host video player device and one of the plurality of video player devices; and selectively performing video timing adjustment in response to the video timing delta exceeding a threshold and both the commercial flag being unset and the live flag being unset, while not performing video timing adjustment when either the commercial flag is set or the live flag is set.

* * * * *